United States Patent
Bensmann

(10) Patent No.: US 12,371,146 B2
(45) Date of Patent: Jul. 29, 2025

(54) WING FOR AN AIRCRAFT

(71) Applicant: Airbus Operations GmbH, Hamburg (DE)

(72) Inventor: Stefan Bensmann, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 4 days.

(21) Appl. No.: 18/346,989

(22) Filed: Jul. 5, 2023

(65) Prior Publication Data

US 2024/0017817 A1 Jan. 18, 2024

(30) Foreign Application Priority Data

Jul. 7, 2022 (DE) .......................... 102022116951.0
Oct. 6, 2022 (DE) .......................... 102022125771.1

(51) Int. Cl.
*B64C 3/48* (2006.01)
*B64C 13/30* (2006.01)

(52) U.S. Cl.
CPC ................ *B64C 3/48* (2013.01); *B64C 13/30* (2013.01)

(58) Field of Classification Search
CPC .... B64C 3/28; B64C 3/48; B64C 3/50; B64C 3/16; B64C 3/44
See application file for complete search history.

(56) References Cited

U.S. PATENT DOCUMENTS

| | | | |
|---|---|---|---|
| 3,941,334 A | | 3/1976 | Cole |
| 4,053,124 A | * | 10/1977 | Cole .................. B64C 3/48 |
| | | | 244/215 |
| 4,285,482 A | | 8/1981 | Lewis |
| 4,399,970 A | * | 8/1983 | Evans ................... B64C 9/24 |
| | | | 244/99.3 |
| 4,445,655 A | * | 5/1984 | Hueberger ............ B64C 9/24 |
| | | | 244/210 |
| 7,923,096 B2 | * | 4/2011 | Starke .................. B64C 3/28 |
| | | | 428/72 |

(Continued)

FOREIGN PATENT DOCUMENTS

| EP | 2883787 A1 | 6/2015 |
|---|---|---|
| EP | 2726372 B1 | 10/2015 |

(Continued)

OTHER PUBLICATIONS

German Search Report for Application No. 102022125771 dated Mar. 14, 2023.

(Continued)

*Primary Examiner* — Joshua J Michener
*Assistant Examiner* — Cindi M Curry
(74) *Attorney, Agent, or Firm* — KDW Firm PLLC

(57) ABSTRACT

A wing for an aircraft includes a leading edge, a trailing edge, an upper skin extending between the leading edge and the trailing edge, a lower skin extending between the leading edge and the trailing edge, at least one spar extending between the upper skin and the lower skin in a spanwise direction to create a wing box with the upper skin and the lower skin, and at least one droop nose at the leading edge, wherein the at least one droop nose is coupled with a forward end of a hinge arm that extends in a chordwise direction, and wherein a rearward end of the hinge arm is swivably supported directly at or in the wing box.

20 Claims, 2 Drawing Sheets

(56) References Cited

U.S. PATENT DOCUMENTS

| | | | |
|---|---|---|---|
| 8,128,038 B2 | 3/2012 | Whitehouse | |
| 8,534,611 B1* | 9/2013 | Pitt | B64C 3/48 |
| | | | 244/214 |
| 9,415,856 B2* | 8/2016 | Rawdon | B64C 3/48 |
| 10,589,839 B2 | 3/2020 | Schlipf | |
| 11,260,956 B2* | 3/2022 | Hermel | B64C 3/28 |
| 2005/0281987 A1 | 12/2005 | Starke | |
| 2010/0133387 A1* | 6/2010 | Wood | B64C 3/48 |
| | | | 244/219 |
| 2013/0277498 A1* | 10/2013 | Winkelmann | B64C 13/341 |
| | | | 244/99.3 |
| 2014/0138481 A1 | 5/2014 | Sakota | |
| 2020/0307772 A1* | 10/2020 | Farouz-Fouquet | B64C 3/26 |

FOREIGN PATENT DOCUMENTS

| | | | |
|---|---|---|---|
| EP | 4140878 A1 | 3/2023 | |
| GB | 1461792 A | 1/1977 | |

OTHER PUBLICATIONS

Extended European Search Report for Application No. 23180814 dated Oct. 30, 2023.

* cited by examiner

WING FOR AN AIRCRAFT

TECHNICAL FIELD

The disclosure herein relates to a wing for an aircraft and an aircraft having such a wing.

BACKGROUND

Commercial or transport aircraft having fixed wings are usually equipped with high lift systems that comprise deployable high lift devices for selectively increasing the wing surface and/or the camber for start and landing procedures. These high lift devices often comprise leading-edge and trailing-edge devices. For example, a droop nose is provided at a leading edge of the wing and is movable from a retracted position, in which the slat is flush with a fixed wing part, into a downward direction through an actuation mechanism.

The actuation mechanism is usually located inside the fixed wing part and may comprise two swivably supported hinge arms that are spaced apart in a spanwise direction and coupled with the droop nose through lugs, knuckles, joints, or other coupling devices. The hinge arms are commonly arranged forward of a front spar, which is usually fluid-tight as it acts as a forward delimitation for a fuel tank arranged inside a so-called wing box. In a comparable manner, the wing box has a rear spar, behind which an actuation mechanism for trailing-edge control surfaces may be provided. Thus, the front spar and rear spar are usually designed in a fluid-tight manner and represent installation boundaries for high lift control systems.

For example, EP 2 726 372 B1 shows a wing assembly having a main wing and a high-lift body movably coupled to the leading edge of the main wing, the coupling achieved by a driving device, an adjusting lever arrangement having a first main wing lever coupled to the main wing formed between a first adjusting lever pivot joint and the high-lift body as well as a second main wing lever coupled to the main wing so as to form an effective lever arm between a second adjusting lever pivot joint and a first adjusting lever pivot joint, and at least one adjusting lever non-rotatably coupled to the high-lift body, the high-lift body being movable between an initial position and a maximally adjusted position with respect to the initial position, at least one guide mechanism aiding movement of the high-lift body.

SUMMARY

In future aircraft, other concepts for storing fuel or other energy carriers may be considered. Thus, it is an object of the subject matter herein to disclose an alternative wing design that is improved regarding the support of high lift control surfaces, in particular of a droop nose.

This object is met by a wing having features disclosed herein. Advantageous embodiments and further improvements may be gathered from the following description.

A wing for an aircraft is disclosed, comprising a leading edge, a trailing edge, an upper skin extending between the leading edge and the trailing edge, a lower skin extending between the leading edge and the trailing edge, at least one spar extending between the upper skin and the lower skin in a spanwise direction to create a wing box with the upper skin and the lower skin, and at least one droop nose arranged at the leading edge, wherein the at least one droop nose is coupled with a forward end of a hinge arm that extends in a chordwise direction, and wherein a rearward end of the hinge arm is swivably supported directly at or in the wing box.

The leading edge is a forwardmost part of the wing, which faces into the flight direction, i.e. into the airflow. It is usually not far from a stagnation line that separates an upper and a lower part of the wing and that may be found close to the region where the wing has its maximum curvature. The trailing edge represents a rearmost edge. The upper skin and the lower skin are curved to provide the desired aerodynamic characteristics, which may depend on the desired velocity and altitude range of the aircraft, to which the wing is attached.

At the leading edge, one or more droop noses may be provided. By moving the droop nose downwards along a forward end of a fixed wing part, the camber of the leading-edge region is increased. Each droop nose may be connected to one or a pair of actuation elements in the form of a hinge arm, which is driven through an actuator.

For providing a sufficient structural stability, the wing, i.e. the main or fixed wing part, comprises at least one spar that extends along the spanwise direction. This may include a front spar and/or a rear spar. It is advantageous to use at least one front spar and at least one rear spar to create a box-like structure with the upper skin and the lower skin, which box-like structure is referred to as wing box.

Future aircraft may not require the wing box to be completely filled with kerosene, but instead use other smaller, separate tanks or other kinds of energy carriers, such as pressure tanks or cryogenic tanks for storing hydrogen, electrical energy storage devices or other. This allows to design the front and/or the rear spar differently. In particular, the respective spar does not need to be fluid-tight and does not represent a delimitation for an interior fuel tank.

The above-identified object is solved by supporting the rearward end of the hinge arm inside or directly at the wing box. Thus, the hinge arm may comprise a length in a chordwise direction that clearly exceeds the length of common hinge arms, since it can be swivably supported in a region, which is commonly only used as a fuel tank for storing kerosene. A dedicated sealing or an elaborate design of sealed pockets in the front spar or a tank delimited by the front spar is not required. Since the fluid-tightness is not necessary and since the position of the front spar is not a dimensioning factor of a fuel tank, the front spar may even be placed more forward or more rearward in comparison with common wing designs, upon desire and depending mainly on the structural stability of the wing. The mechanical design of a wing or a wing box may thus be driven mainly by the aerodynamics and the structural stability.

Since the front spar is only used for providing the mechanical stability for the wing box, the hinge arm may be directly attached to a forward side, a rearward side or both. Also, the rearward end may be placed completely inside the wing box, such that the hinge arm protrudes through front spar. In addition, this increased length allows to increase a rotation radius of the droop nose, which may further improve the aerodynamic performance. If the hinge arm protrudes through the front spar, the front spar may comprise a support element for supporting the hinge arm for introducing mechanical loads directly into the front spar. The support element may be adjustable to compensate manufacturing tolerances.

In an advantageous embodiment, the at least one spar comprises a front spar and a rear spar, wherein the rearward end is arranged on the front spar or rearward of the front spar. Preferably, the front spar and the rear spar are arranged to follow constant chordwise points along the spanwise dimension. In other words, they may both be placed at a certain relative position of local chords throughout a major spanwise part of the wing. It is not ruled out that the wing according to the disclosure herein also has a main spar that is arranged between the front spar and the rear spar. Since the hinge arm is coupled to the droop nose, the rearward end is located at least near the front spar.

In an advantageous embodiment, the hinge arm extends through an opening arranged in the front spar. The opening should be dimensioned in a way that the hinge arm protrudes through it without contacting edges of the opening in every possible extension state of the droop nose, even when the wing elastically deforms during flight. A dedicated, sealed pocket directly following the opening is not required.

In an advantageous embodiment, the at least one spar comprises a framework structure. Thus, the respective spar does not comprise a closed surface, but is created by a planar structure consisting of a plurality of interconnected elongate or flat elements. This reduces the weight of the respective spar. Since a framework has a plurality of openings, in particular the design of the front spar and the hinge arm can be harmonized, such that the hinge arm can pass through one of the openings of the framework structure.

In an advantageous embodiment, the wing further comprises an actuator coupled with the hinge arm, wherein the actuator is arranged in front of the wing box and/or directly on the at least one spar. For example, the actuator may be placed in front of the front spar, directly on a front side of the front spar outside the wing box or directly on a rear side of the front spar inside the wing box. The actuator may be a rotary or linear actuator. It may be a hydraulic or electric actuator, which may optionally comprise a gear. For example, it may be a geared rotary actuator. The actuator may be coupled with the hinge arm through an actuation lever, which comprises a first end and a second end, wherein the first end is swivably coupled with the hinge arm and wherein the second end is swivably coupled with an arm of the actuator. The arm may extend in a radial direction from a rotational axis of the actuator and may be rigidly coupled with the actuator. The motion of the hinge arm is controlled by the position of the rearward end, the placement of the first end along the hinge arm, the design of the respective actuator lever, the length of the arm of the actuator and the angular speed of the arm.

In an advantageous embodiment, the hinge arm comprises a forward section, a rearward section and a kink between the forward section and the rearward section, wherein the sections run vertically upwards towards the kink in a retracted position of the droop nose. The kink allows to place the forward end of the hinge arm in a lower vertical position than with a straight arm, since a contact between a lower contour of the hinge arm and an inner side of the lower skin as well as stiffening elements arranged thereon can be avoided. The kink of the hinge arm may be provided in or close to a region where an actuator is coupled with the hinge arm.

In an example embodiment, the kink passes through a plane defined by the front spar when moving the hinge arm between a retracted position and extended positions. The kink is thus arranged in the region of the front spar, which allows to avoid a contact between the hinge arm and a bottom side of the front spar and thus increases the radius of deployment of the droop nose.

In an example embodiment, the rearward section of the hinge arm is substantially horizontal in a maximum extended position of the droop nose. If the forward and rearward sections create an inverted V-shape, it is advantageous if the kink is placed in the plane defined by the front spar in the maximum extended position of the droop nose, as the rearward section may then move as close as possible to the lower surface. The swivel axis for the hinge arm may be placed in substantially the same vertical position as the kink in the maximum extended position. However, it may be as close as possible to the lower skin. The forward end of the hinge arm may be moved as far downward as possible in this configuration.

In an example embodiment, the hinge arm is designed to move the forward end downwards to extend the droop nose. The droop nose may be rigidly coupled with the hinge arm, such that it directly follows the motion of the hinge arm.

In an example embodiment, the rearward end of the hinge arm is supported in a swiveling joint having a swivel axis that is arranged at a relative chordwise position of at least 20% of the respective local chord. The hinge arm thus clearly extends further in a rearward direction than in commonly designed wings.

In an advantageous embodiment, the wing further comprises a plurality of parallel ribs between the upper skin and the lower skin, extending in a chordwise direction and arranged at a distance to each other, wherein the rearward end of the hinge arm is swivably supported between or adjacent to the ribs. Inside the wing box, additional installation space for supporting the hinge arm is available and may be used through attaching or supporting the respective parts to lateral faces of the ribs. This allows a simple design for mechanically holding a support for the hinge arm and allows to place the rearward end further away from the leading edge.

Furthermore, the disclosure herein relates to an aircraft comprising at least one wing according to the above.

BRIEF DESCRIPTION OF THE DRAWINGS

In the following, the attached drawings are used to illustrate exemplary embodiments in more detail. The illustrations are schematic and not to scale. Identical reference numerals refer to identical or similar elements. They show.

DETAILED DESCRIPTION

Figure 1:
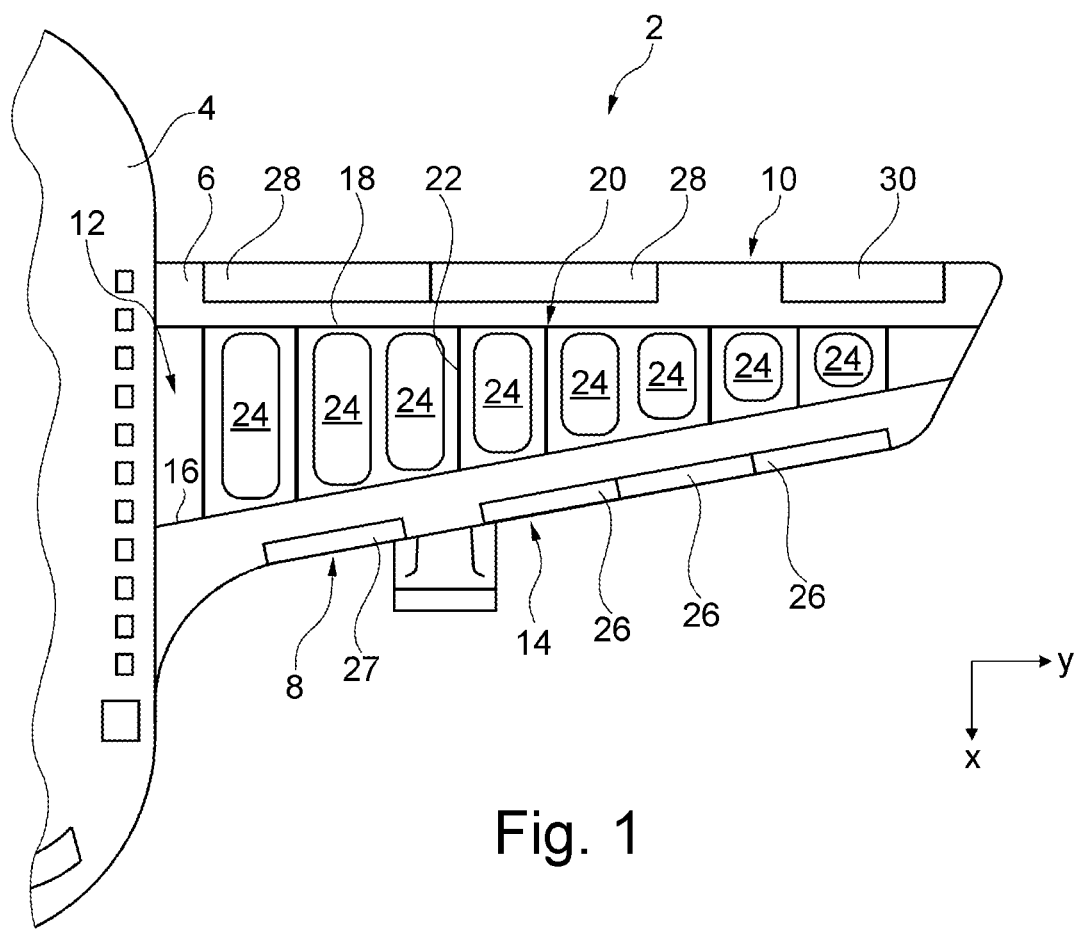
FIG. 1 schematically shows a part of an aircraft in a top view with a partial section.

FIG. 1 shows a part of an aircraft 2 having a fuselage 4 and a wing 6. The wing 6 comprises a leading edge 8 as a first chordwise edge, the trailing edge 10 as a second chordwise edge, an upper skin 12 extending between the leading edge 8 and the trailing edge 10 and a lower skin 14, which is obstructed in this view and which also extends between the leading-edge 8 and the trailing edge 10. A front spar 16 runs along the leading-edge 8, extends substantially in spanwise direction and is preferably parallel to the z-axis, which is the vertical axis in an aircraft-fixed coordinate system. A rear spar 18 is provided, which extends substantially parallel to the trailing edge 10. It is to be understood, that the front spar 16 and the rear spar 18 are completely enclosed by the upper skin 12 and the lower skin 14. The upper skin 12, the lower skin 14, the front spar 16 and the rear spar 18 create a wing box 20.

On the inner surfaces of the upper skin 12 and the lower skin 14 a plurality of chordwise stiffening elements, such as stringers or the like, may be arranged. Together with a plurality of parallelly arranged ribs 22 that extend between the front spar 16 and the rear spar 18 in chordwise directions, the wing box 20 constitutes a rigid, load-carrying structure. Exemplary, several pressure tanks 24 are arranged inside the wing box 20 and are distanced to each other in the span wise direction. Different than in common commercial or transport aircraft neither the front spar 16 nor the rear spar 18 needs to be fluid-tight since the wing box 20 itself is not used as a fuel tank. It is to be understood, that instead of several pressure tanks 24, other separate tanks may be provided or even electrical storage devices or any other energy carrier storing devices.

The wing 6 furthermore comprises leading-edge high-lift devices 26 and 27, which are exemplarily realized in the form of slats 26 and droop noses 27. At the trailing edge 10, trailing-edge high-lift devices 28 in the form of slats are provided. In addition, an aileron 30 is shown. Due to the wing box 20 not acting as a fuel tank itself, in particular the front spar 16 allows to hold support devices for supporting the leading-edge high-lift devices 26 and 27.

Figure 2:
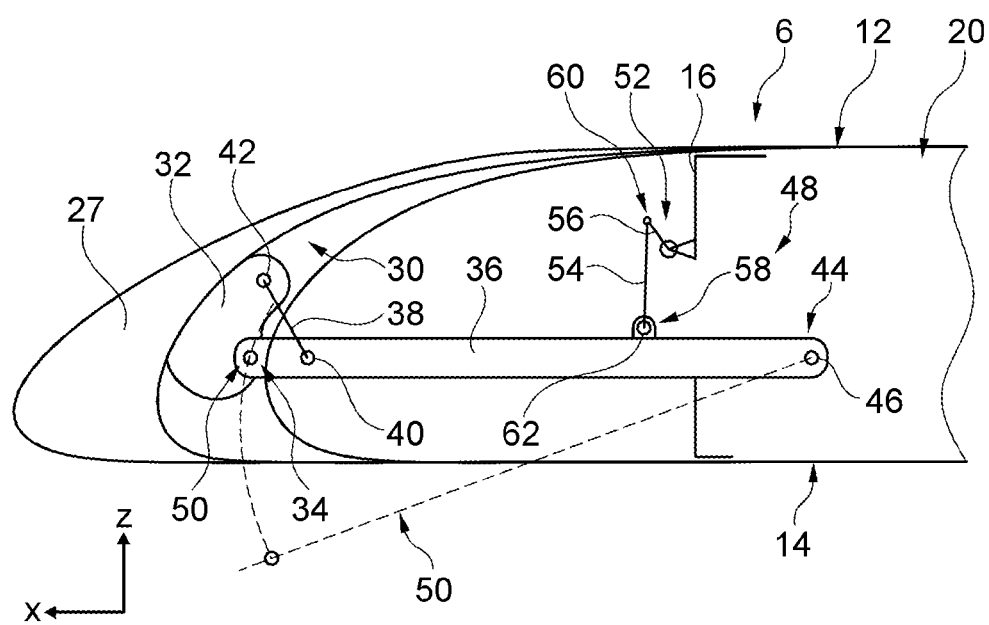
FIGS. 2 and 3 show a part of a wing with a droop nose.

In FIG. 2, a cross-sectional view of a forward part of the wing 6 is shown, with the droop nose 27 in a retracted position. At the rear side 30 of the droop nose 27, a bracket 32 is attached. A bottom joint 50 of the bracket 32 is coupled with a forward end 34 of a hinge arm 36. An auxiliary lever 38 connects an intermediate section 40 of the hinge arm 36 with an upper joint 42 of the bracket 32. Thus, the droop nose 27 is rigidly connected to the hinge arm 36 and exactly follows the motion of its forward end 34. A rearward end 44 is coupled with a swiveling joint 46, which is arranged inside the wing box 20 behind the front spar 16. For reaching the swiveling joint 46, the hinge arm 36 extends through an opening 48 of the front spar 16. The hinge arm 36 thus has a length clearly exceeds the length of comparable linkages of common aircraft. This allows to provide a clearly increased radius of deployment of the forward end 34. For a vertical motion component that is required for extending the droop nose 27, a significantly lower angular motion of the hinge arm 36 is required.

For driving the hinge arm 36 to swivel around the swiveling joint 46, exemplarily a geared rotary actuator 52 is shown that comprises an actuator arm 56.

A first end 58 of an actuation lever 54 is coupled with a driving joint 62 arranged between the forward end 34 and the rearward end 44 of the hinge arm 36. A second end 60 of the actuation lever 54 is coupled with the actuator arm 56. By rotating the actuator arm 56, the actuation lever 54 is pulled upwards or pushed downwards to move the hinge arm 36 accordingly. Other variants are also conceivable, which may also include linear actuators.

Figure 3:
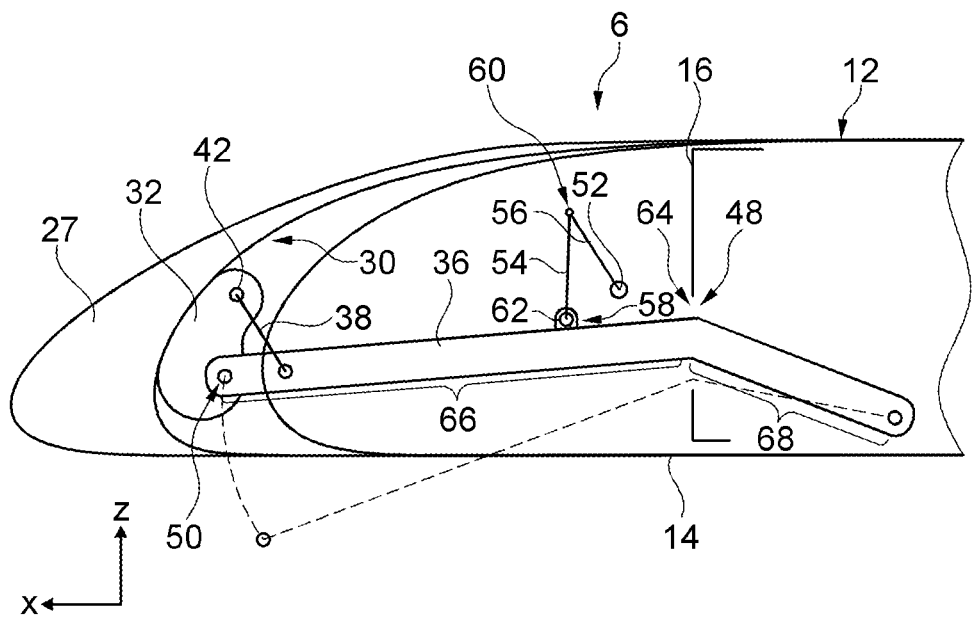

In FIG. 3 substantially the same arrangement is shown as in FIG. 2. However, here the hinge arm 36 comprises a kink 64, which separates a forward section 66 from a rearward section 68. The hinge arm 36 thus comprises an inverted V-shape, and in the retracted position of the droop nose 27, the kink 64 is above the forward end 34 and the rearward end 44. This may further increase the radius of deployment.

Figure 4:
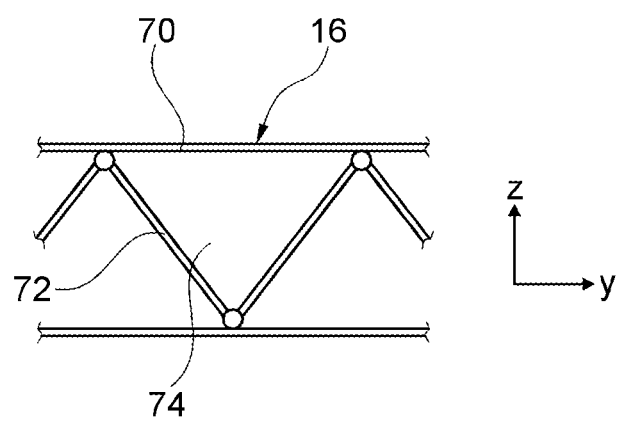
FIG. 4 schematically shows a front spar having a framework structure.

Lastly, FIG. 4 shows the front spar 16 in a front view. It is apparent that the front spar 16 exemplarily comprises a framework structure with longitudinal beams 70 and crossbeams 72, that are interconnected. Between the beams 70 and the crossbeams 72, a plurality of openings 74 are provided. These allow to pass through at least the hinge arm 36.

While at least one example embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the example embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

REFERENCE NUMERALS 2 aircraft
4 fuselage
6 wing
8 leading edge
10 trailing edge
12 upper skin
14 lower skin
16 front spar
18 rear spar
20 wing box
22 rib
24 pressure tank
26 leading-edge high-lift device/slat
27 droop nose
28 trailing-edge high-lift device
30 rearward side
32 bracket
34 forward end
36 hinge arm
38 auxiliary lever
40 intermediate section
42 upper joint
44 rearward end
46 swiveling joint
48 opening
50 bottom joint
52 geared rotary actuator
54 actuation lever
56 actuator arm
58 first end
60 second end
62 driving joint
64 kink
66 forward section
68 rearward section
70 longitudinal beam
72 crossbeam
74 opening

The invention claimed is:
1. A wing for an aircraft, comprising:
a leading edge;
a trailing edge;
an upper skin extending between the leading edge and the trailing edge;
a lower skin extending between the leading edge and the trailing edge;

at least one spar extending between the upper skin and the lower skin in a spanwise direction to create a wing box with the upper skin and the lower skin;
at least one droop nose at the leading edge;
a bracket attached directly to the at least one droop nose; and
a hinge arm that extends in a chordwise direction and is directly attached, at a forward end thereof, to the bracket;
wherein a rearward end of the hinge arm is supported directly at or in the wing box in a swivelable manner;
wherein the hinge arm extends continuously between the forward and rearward ends thereof;
wherein the hinge arm is movable between a retracted position and an extended position; and
wherein there is no translatory movement of the rearward end of the hinge arm when the hinge arm is at the retracted position, the extended position, or when the hinge arm moves from the retracted position to the extended position or from the extended position to the retracted position.

2. The wing of claim 1, wherein:
the at least one spar comprises a front spar and a rear spar; and
the rearward end is on the front spar or rearward of the front spar.

3. The wing of claim 1, wherein the hinge arm extends through an opening in the front spar.

4. The wing of claim 1, wherein the at least one spar comprises a framework structure.

5. The wing of claim 1, further comprising an actuator coupled with the hinge arm;
wherein the actuator is in front of the wing box and/or directly on the at least one spar.

6. The wing of claim 1, wherein:
the hinge arm comprises a forward section, a rearward section and a kink between the forward section and the rearward section;
the forward end is in the forward section;
the rearward end is in the rearward section; and
the forward and rearward sections both are vertically inclined towards the kink when the at least one droop nose is in the retracted position.

7. The wing of claim 6, wherein:
the at least one spar comprises a front spar and a rear spar;
the rearward end is on the front spar or rearward of the front spar; and
the kink passes through a plane defined by the front spar when moving the hinge arm between the retracted position and the extended position.

8. The wing of claim 6, wherein the rearward section of the hinge arm is substantially horizontal in the extended position of the droop nose.

9. The wing of claim 1, wherein the hinge arm is configured to move the forward end downwards to extend the droop nose.

10. The wing of claim 1, wherein the rearward end of the hinge arm is supported in a swiveling joint having a swivel axis.

11. The wing of claim 1, further comprising a plurality of parallel ribs between the upper skin and the lower skin, extending in the chordwise direction and arranged at a distance to each other;
wherein the rearward end of the hinge arm is supported between or adjacent to the ribs in a swivelable manner.

12. An aircraft comprising at least one wing according to claim 1.

13. A wing for an aircraft, comprising:
a leading edge;
a trailing edge;
an upper skin extending between the leading edge and the trailing edge;
a lower skin extending between the leading edge and the trailing edge;
at least one spar extending between the upper skin and the lower skin in a spanwise direction to create a wing box with the upper skin and the lower skin;
at least one droop nose at the leading edge;
a bracket attached directly to the at least one droop nose; and
a hinge arm that extends in a chordwise direction and is directly attached, at a forward end thereof, to the bracket;
wherein the hinge arm comprises a forward section, a rearward section, and a kink between the forward section and the rearward section;
wherein the forward end of the hinge arm is in the forward section;
wherein a rearward end of the hinge arm is in the rearward section and is supported directly at or in the wing box in a swivelable manner;
wherein the hinge arm extends continuously between the forward and rearward ends thereof; and
wherein the forward section and the rearward section are both vertically inclined towards the kink when the at least one droop nose is in a retracted position.

14. The wing of claim 13, wherein:
the at least one spar comprises a front spar and a rear spar;
the rearward end is on the front spar or rearward of the front spar; and
the kink passes through a plane defined by the front spar when moving the hinge arm between the retracted position and the extended position.

15. The wing of claim 13, wherein:
the at least one spar comprises a front spar and a rear spar; and
the rearward end is on the front spar or rearward of the front spar.

16. The wing of claim 13, wherein:
the rearward section of the hinge arm is substantially horizontal in the extended position of the droop nose; or
the hinge arm extends through an opening in the front spar; or
the at least one spar comprises a framework structure.

17. The wing of claim 13, further comprising an actuator coupled with the hinge arm;
wherein the actuator is in front of the wing box and/or directly on the at least one spar.

18. The wing of claim 13, wherein:
the hinge arm is configured to move the forward end downwards to extend the droop nose; or
the rearward end of the hinge arm is supported in a swiveling joint having a swivel axis.

19. The wing of claim 13, further comprising a plurality of parallel ribs between the upper skin and the lower skin, extending in the chordwise direction and arranged at a distance to each other;
wherein the rearward end of the hinge arm is supported between or adjacent to the ribs in a swivelable manner.

20. An aircraft comprising at least one wing according to claim 13.

* * * * *